(12) United States Patent
Hofen et al.

(10) Patent No.: US 6,749,668 B2
(45) Date of Patent: Jun. 15, 2004

(54) PROCESS FOR THE RECOVERY OF COMBUSTIBLE COMPONENTS OF A GAS STREAM

(75) Inventors: Willi Hofen, Rodenbach (DE); Georg Thiele, Hanau (DE); Wolfgang Wöll, Maintal (DE)

(73) Assignees: Degussa AG, Düsseldorf (DE); Uhde GmbH, Dortmund (DE)

( * ) Notice: Subject to any disclaimer, the term of this patent is extended or adjusted under 35 U.S.C. 154(b) by 26 days.

(21) Appl. No.: 10/174,549

(22) Filed: Jun. 18, 2002

(65) Prior Publication Data

US 2002/0189450 A1 Dec. 19, 2002

Related U.S. Application Data

(60) Provisional application No. 60/298,377, filed on Jun. 18, 2001.

(51) Int. Cl.$^7$ .......................... B01D 53/14; B01D 47/02
(52) U.S. Cl. .......................... 95/226; 95/237; 95/240; 549/538; 549/542
(58) Field of Search .......................... 95/237, 238, 239, 95/240, 226, 210, 211, 213; 96/290, 299, 229–354; 549/538, 541, 542

(56) References Cited

U.S. PATENT DOCUMENTS

| | | | | |
|---|---|---|---|---|
| 803,139 A | * | 10/1905 | Sinn et al. |
| 2,031,164 A | * | 2/1936 | Johnson |
| 2,241,019 A | * | 5/1941 | Metzger |
| 2,325,576 A | * | 7/1943 | Balcar |
| 2,325,577 A | * | 7/1943 | Balcar |
| 2,432,423 A | * | 12/1947 | Hunter |
| 2,644,837 A | * | 7/1953 | Schweitzer |
| 2,824,119 A | * | 2/1958 | Gardner et al. |
| 2,870,171 A | | 1/1959 | Gable |
| 3,427,229 A | * | 2/1969 | Herzog |
| 3,452,055 A | * | 6/1969 | Golden et al. |
| 3,644,432 A | * | 2/1972 | Hoch et al. |
| 4,210,426 A | * | 7/1980 | Sridhar |
| 4,304,639 A | * | 12/1981 | Hardy et al. |
| 4,410,501 A | | 10/1983 | Taramasso et al. |
| 4,415,508 A | * | 11/1983 | Aida et al. |
| 4,833,260 A | | 5/1989 | Neri et al. |
| 4,875,909 A | * | 10/1989 | Kakimoto et al. |
| 5,127,997 A | * | 7/1992 | Smith et al. |
| 5,166,372 A | * | 11/1992 | Crocco et al. |
| 5,214,168 A | * | 5/1993 | Zajacek et al. |
| 5,233,060 A | * | 8/1993 | Pendergast et al. |
| 5,468,885 A | * | 11/1995 | Jubin, Jr. |

(List continued on next page.)

FOREIGN PATENT DOCUMENTS

| | | |
|---|---|---|
| DE | 196 23 611 | 12/1997 |
| DE | 197 23 950 | 12/1998 |
| DE | 197 54 185 | 2/1999 |

(List continued on next page.)

OTHER PUBLICATIONS

European Search Report for European Patent Application No. 01 11 4576, dated Nov. 6, 2001, 3 pps.

*Primary Examiner*—Duane S Smith
(74) *Attorney, Agent, or Firm*—Smith, Gambrell & Russell, LLP

(57) ABSTRACT

A process for the recovery of combustible components of a gas stream containing the combustible components and oxygen by selective absorption of the combustible components in a solvent, whereby during the absorption the gas phase is dispersed in a continuous liquid phase of the solvent. In a preferred embodiment the process is applied to give a process for the epoxidation of propene with hydrogen peroxide in the alcoholic solvent in presence of a catalyst, wherein a gas stream including unreacted propene, propene oxide and oxygen from the decomposition of the hydrogen peroxide is separated from the epoxidation reaction mixture and the combustible components in said gas stream are recovered using the process as described above.

33 Claims, 1 Drawing Sheet

U.S. PATENT DOCUMENTS

| | | | |
|---|---|---|---|
| 5,523,426 A | 6/1996 | Jubin, Jr. et al. | |
| 5,591,875 A | 1/1997 | Chang et al. | |
| 5,599,955 A | 2/1997 | Vora et al. | |
| 5,620,935 A | 4/1997 | Thiele | |
| 5,675,026 A | 10/1997 | Thiele | |
| 5,760,253 A | 6/1998 | Danner et al. | |
| 5,849,937 A | 12/1998 | Jubin, Jr. et al. | |
| 5,849,938 A | 12/1998 | Rueter et al. | |
| 5,912,367 A | 6/1999 | Chang | |
| 6,042,807 A | 3/2000 | Faraj | |
| 6,063,941 A | 5/2000 | Gilbeau | |
| 6,372,924 B2 | 4/2002 | Thiele | |
| 6,596,883 B2 * | 7/2003 | Hofen et al. | |
| 6,624,319 B2 * | 9/2003 | Hofen et al. | |
| 2002/0189450 A1 * | 12/2002 | Hofen et al. | |
| 2003/0109725 A1 * | 6/2003 | Hofen et al. | |

FOREIGN PATENT DOCUMENTS

| | | |
|---|---|---|
| DE | 198 35 907 | 2/2000 |
| EP | 0 100 118 | 2/1984 |
| EP | 0 100 119 | 2/1984 |
| EP | 0 106 671 | 4/1984 |
| EP | 0 133 510 A1 | 2/1985 |
| EP | 0 230 349 | 7/1987 |
| EP | 0 230 949 | 8/1987 |
| EP | 0 425 893 A1 | 5/1991 |
| EP | 0 568 336 | 11/1993 |
| EP | 0 568 337 | 11/1993 |
| EP | 0 583 828 A2 | 2/1994 |
| EP | 0 645 473 | 3/1995 |
| EP | 0 659 473 | 6/1995 |
| EP | 0 712 852 | 5/1996 |
| EP | 0 719 768 A1 | 7/1996 |
| EP | 0 757 045 | 2/1997 |
| EP | 0 795 537 | 9/1997 |
| EP | 0 827 765 A2 | 3/1998 |
| EP | 0 930 308 | 7/1999 |
| EP | 0 936 219 | 8/1999 |
| EP | 1 122 248 | 8/2001 |
| EP | 1 138 387 | 10/2001 |
| EP | 1 221 442 | 7/2002 |
| JP | 2166636 | 6/1990 |
| WO | WO 97/47613 | 12/1997 |
| WO | WO 97/47614 | 12/1997 |
| WO | WO 98/47845 | 10/1998 |
| WO | WO 99/01445 | 1/1999 |
| WO | WO 99/07690 | 2/1999 |
| WO | WP 99/11639 | 3/1999 |
| WO | WO 00/07695 | 2/2000 |
| WO | WO 00/17178 | 3/2000 |
| WO | WO 00/25881 | 5/2000 |
| WO | WO 02/02545 A1 | 1/2002 |

* cited by examiner

PROCESS FOR THE RECOVERY OF COMBUSTIBLE COMPONENTS OF A GAS STREAM

REFERENCE TO A RELATED APPLICATION

This application claims the benefit of provisional application No. 60/298,377 filed on Jun. 18, 2001 which is relied on and incorporated herein by reference.

INTRODUCTION AND BACKGROUND

The present invention relates to a process for the recovery of combustible components of a gas stream comprising the combustible components and oxygen by selective absorption of the combustible components in a solvent. The present invention in particular refers to a process for recovery of combustible components from an exit gas stream from an oxidation reaction with a peroxide component, whereby due to the decomposition of the peroxide, oxygen is accumulated during the oxidation reaction. The present invention is particularly suitable for a working-up stage in a process for epoxidation of olefins.

In numerous processes involving oxidation with peroxide compounds, particularly hydrogen peroxide, gas mixtures are formed that comprise considerable amounts of organic combustible components in addition to molecular oxygen resulting from the decomposition of the peroxide compounds. For safety reasons, these processes have to be conducted to ensure that the oxygen content is below the explosion limit. For economic reasons, it is often necessary to recover the combustible components of an exit gas stream, since they may contain valuable compounds like, for example, product compounds or components that can be recycled to the initial reaction stage. Therefore, it has been proposed to recover the combustible components by selective absorption in a suitable solvent.

The oxygen content of the gas phase increases within the absorption unit due to the absorption of organic combustible components in the solvent. This may have the consequence that even if the gas stream entering the absorption unit is not an ignitable composition, it may become ignitable during the process of absorption. Therefore, for safety reasons, an inert gas is introduced in the absorption unit to avoid, under any condition, the formation of an ignitable composition within the absorption unit.

For example, EP-A-719 768 describes a process for the epoxidation of an olefin with hydrogen peroxide, wherein a gas mixture of the olefin and oxygen from hydrogen peroxide decomposition is separated from the liquid epoxidation reaction mixture and the olefin is absorbed from the gas mixture in a liquid absorbent and inert gas is added to the oxygen in an amount sufficient to prevent formation of a flammable gas composition. Referring to the example in EP-A-719 768 the absorption liquid is introduced into the upper section and the gaseous purge stream into the lower section of the absorption zone to ensure a counter-current flow. But there is no indication whether the liquid phase or the gas phase is the continuous phase.

Similarly, European Patent Application 00102542.8 discloses a process for the working-up of an exit gas stream from the epoxidation of an olefin with hydrogen peroxide, comprising olefin oxide, unreacted olefin, and oxygen, whereby the exit gas stream is brought into contact in an absorption unit with the same solvent as used in the epoxidation stage, and a solvent stream loaded with olefin and olefin oxide is drawn off from the absorption unit, and an exit gas stream containing oxygen is discharged. Additionally, an inert gas stream is introduced into the absorption unit, wherein the inert gas leaves the absorption unit together with the oxygen in the exit gas stream. The quantity of inert gas introduced is preferably selected as a function of the quantity and composition of the exit gas stream leaving the reaction stage, such that the exit gas stream leaving the absorption unit is no longer an ignitable composition. Thereby, measures are taken to avoid at any stage within the absorption unit the presence of an ignitable composition. There is a considerable drawback associated with this procedure. Due to the addition of inert gas, the total gas stream within the absorption unit is drastically increased. Accordingly, the efficiency of the absorption is reduced and larger absorption units and larger amounts of absorbing solvents are necessary to achieve the desired separation of valuable organic components from the exit gas stream of a reaction zone.

EP-A-583 828 discloses a process for ethylene recovery in direct-oxidation ethylene oxide processes. According to the disclosure starting from column 4, lines 46 to column 5, line 18 the ethylene-containing stream enters an absorber column, wherein ethylene is preferentially absorbed in a high molecular weight organic liquid. There is no explicit disclosure in that reference whether the liquid phase of the absorbent solvent is the continuous phase and the gas phase is dispersed in that continuous phase. The information given in column 5, lines 6 to 18 is insufficient for a person skilled in the art to determine which of the two phases is continuous and which one is dispersed in the continuous phase. But from the disclosure that the contacting surface may be created by trays, structured packing or random dump packing (column 5, lines 12 to 14 of EP-A-583 828) a person skilled in the art would conclude that the absorption column is run as a trickle bed, i.e. with a liquid phase dispersed in a continuous phase.

Thus, an object of the present invention is to provide a process for the recovery of combustible compounds of a gas stream comprising combustible components and oxygen that does not have the above discussed disadvantages while ensuring safety of the overall process.

SUMMARY OF THE INVENTION

The above and other objects of the invention can be attained by a process for the recovery of combustible components of a gas stream comprising the combustible components and oxygen by selective absorption of the combustible components in a solvent, whereby during the absorption the gas phase is dispersed in a continuous liquid phase of the solvent.

The present inventors have surprisingly discovered that if the gas phase comprising combustible components and oxygen is dispersed in a continuous liquid phase of the solvent during absorption, even if due to the depletion of combustible components from the gas phase the oxygen concentration in the gas phase rises above the explosion limit, the gas phase still cannot be ignited within the absorption unit because the gas phase is finely dispersed in the continuous liquid phase of the solvent. Consequently, addition of inert gas to the gas phase prior to entering the absorption unit or within the absorption zone in the absorption unit is not necessary any longer. Thus, it is preferred that neither prior to entering the absorption unit nor within the absorption zone an inert gas is added. This way, the absorption process is very efficient since the gas phase contains little or no inert gas. Consequently, the dimensions of the absorption unit can be reduced, thereby saving investment costs, and a reduced volume of the absorption fluid, i.e., the solvent, can be used, with the result that the amount of solvent to be recycled or processed in working-up stages can be considerably reduced, thereby improving the overall economics of the process.

But although no inert gas is added prior to entering the absorption zone or in the absorption zone, safety of the process is ensured since the gas phase, although the oxygen content may be above the explosion limit, cannot be ignited.

Preferably, the absorption unit is run as a bubble column.

According to a preferred embodiment, the gas bubbles dispersed in the continuous phase of the absorption solvent have a diameter of 10 millimeters or less, preferably 2–10 millimeters, most preferred 5 millimeters at most.

According to a specifically preferred embodiment of the present invention, the gas stream is introduced into the absorption unit at a lower section of the absorption unit, and the liquid solvent phase enters the absorption unit at a position upwards with respect to the location the gas stream enters the absorption unit, and the liquid solvent phase exits the absorption unit at a position below the entry of the gas stream into the absorption unit. In that way there may be achieved that the gas stream and the solvent pass through the absorption unit in a countercurrent manner. Preferably the absorption unit is run as bubble column.

The flow rate of the dispersed gas phase and of the continuous liquid solvent phase can be varied in wide ranges as long as the requirement that the liquid phase is continuous and the gas phase is dispersed is maintained. The flow rate per cross-section for the gas phase is preferably 10–100 $m^3/m^2h$, more preferred 20–60 $m^3/m^2h$ and the flow rate per cross-section for the liquid phase is preferably 50–200 $m^3/m^2h$, more preferred 100–150 $m^3/m^2h$.

According to a preferred embodiment of the present invention, the gas stream is introduced into the absorption unit with a system of ring nozzles to finely disperse the gas phase in the continuous liquid phase. The dimensions of the absorption unit as well as the flow conditions of the gas phase and the continuous solvent phase are selected to provide gas bubbles dispersed in the continuous liquid phase having a diameter of 10 millimeters or less, preferably 2–10 millimeters, more preferred 5 millimeters at the most. Several measures can be taken singly or in combination to control the above defined bubbles size. For example the cross-section of the orifices of the ring nozzles can be selected to be within the range of 0.2–2 mm, and/or sieve trays can be positioned within the absorption unit in defined spacing having an orifice cross-section of 0.2–2 mm and/or the flow rate of the liquid phase and the gas phase are adjusted as defined above. If sieve trays are used the ratio of the free cross-section of the sieve trays to the cross-section of the absorption unit is preferably adjusted to ensure a flow rate of the gas phase through the perforated plates of 0.5–2 m/s.

The absorption unit that can be used in the process of the present invention may comprise heat exchanger means and/or gas dispersing means. Heat exchanger means can be useful to control the temperature in the absorption unit, especially to remove the heat of absorption. Gas dispersing means may be present to improve gas dispersion and the mass transfer between gas phase and continuous solvent phase. Preferably sieve trays and particularly preferably sieve trays with downcomers are used as gas dispersing means.

For safety reasons, it is preferred to introduce inert gas into the headspace above the liquid level within the absorption unit. In that way, the gas stream exiting the liquid solvent phase is diluted to the extent that the oxygen concentration is below the explosion limit. Since the gas phase after exiting the liquid solvent phase is no longer finely dispersed, the gas mixture will become ignitable in case the oxygen concentration due to depletion of combustible components during the absorption is above the explosion limit.

Any inert gas is suitable that has an oxygen content of less than 10 volume percent and does not form combustible mixtures with oxygen. Preferred inert gas is nitrogen, carbon dioxide or water vapor or mixtures thereof, as may be obtained by usual combustion processes.

According to a preferred embodiment of the present invention no inert gas or only very limited amounts of inert gas are introduced into the gas stream prior to entering the absorption unit or into the absorption zone within the absorption unit to achieve the reduction of absorption unit dimensions and volume of solvent. A suitable upper limit of the ratio of inert gas introduced into the gas stream prior to absorption or into the absorption zone to oxygen present in the gas stream is 5:1. But it is preferred to introduce no inert gas into the absorption zone during the absorption process.

According to an alternative embodiment, the volume of the headspace in the absorption unit above the liquid level is reduced by displacers and the absorption unit is equipped with pressure release means and a flame barrier in the gas exit line. In that case, the amount of inert gas introduced into the headspace can be considerably reduced while ensuring sufficient safety for the absorption process.

As continuous phase within the absorption unit, any liquid can be used that dissolves the combustible components that shall be recovered better than oxygen and that allows easy separation of the recovered components. Thereby, usual organic solvents like alcohols, aromatic and aliphatic hydrocarbons or ketones can be used. It is preferred to use a solvent that is also used in the process the gas stream is derived from prior to the absorption. This is advantageous since then the solvent stream can be either directly recycled into the reaction zone or can be passed to a working-up stage downstream of the reaction stage.

In the process of the present invention, any gas stream from a reaction step wherein oxygen is generated and that contains combustible materials can be processed to recover valuable combustible components. It is particularly preferred that the gas stream is the gaseous effluent of an oxidation process using peroxide compounds. The process of the present invention is especially preferred to recover olefin, and olefin oxide from the gaseous effluent from the epoxidation of an olefin with hydrogen peroxide.

Therefore, the present invention also relates to a process for the epoxidation of propene with hydrogen peroxide in an alcoholic solvent in the presence of a catalyst, wherein a gas stream comprising unreacted propene, propene oxide, and oxygen from the decomposition of the hydrogen peroxide is separated from the reaction mixture and the combustible components in said gas stream are recovered using the process as described above.

According to a particularly preferred embodiment, the same alcoholic solvent as in the epoxidation step is also used in the recovery step. The preferred alcohol is methanol.

The pressure within the absorption unit in the recovery process according to the present invention can be varied within wide ranges and can preferably be between atmospheric pressure and 50 bar, in case of absorption of propene and propene oxide the pressure is preferably within a range of 4–30 bar, more preferred between 10–25 bar.

BRIEF DESCRIPTION OF DRAWINGS

The present invention will be further understood with respect to the attached figures, where.

DETAILED DESCRIPTION OF THE INVENTION

Figure 1:
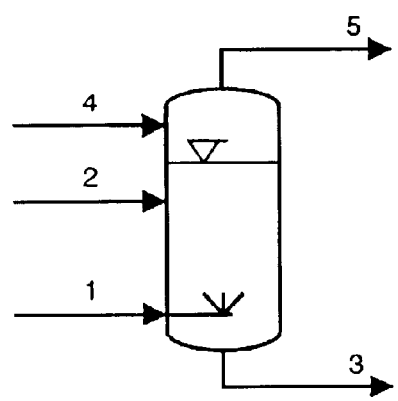
FIG. 1 is a schematic representation of a suitable absorption unit for the present process in cross-section.

Referring to FIG. 1 a tubular absorption unit is schematically represented, wherein the gas stream 1 comprising combustible components and oxygen is introduced into the absorption unit through an inlet that is positioned near the lower end of the absorption unit. The inlet for the solvent stream 2 that forms the continuous liquid phase within the absorption zone is positioned closer to the upper end of the absorption unit. The outlet for the solvent 3 loaded with the absorbed combustible components is located at the bottom of the absorption unit. At the upper end of the absorption unit, an inlet port is positioned to allow introduction of an inert gas 4 in order to dilute the gas prior to exiting the absorption unit to an oxygen concentration below the explosion limit. The exit gas stream 5 comprising oxygen, small amounts of combustible components, and optionally inert gas exits the absorption unit through an outlet positioned at the top of the absorption unit.

Figure 2:
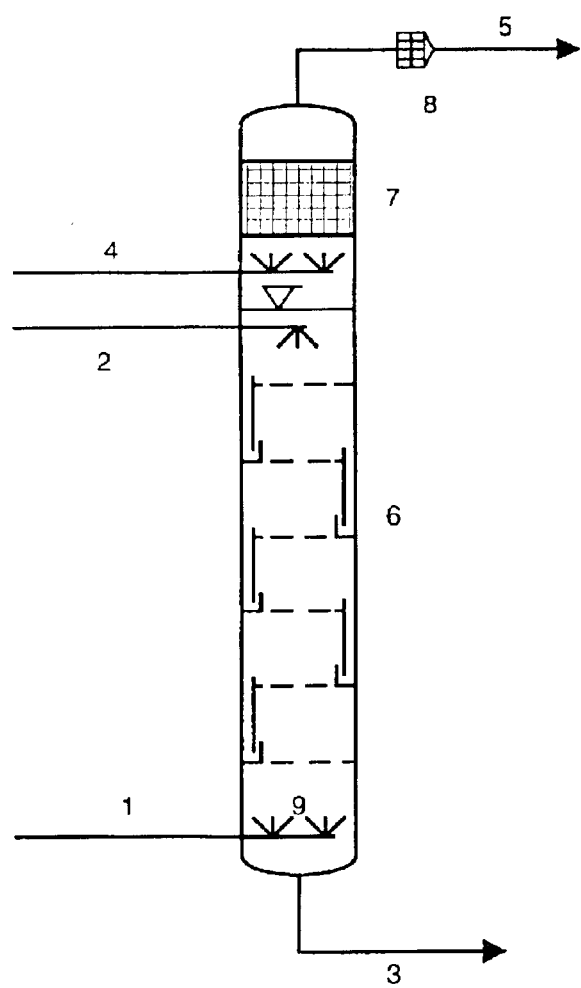
FIG. 2 is a schematic representation of a preferred absorption unit according to the present invention in cross-section.

Referring to FIG. 2 according to a preferred embodiment the gas stream 1 is introduced into the absorption unit through a system of ring nozzles 9 to ensure efficient dispersion of the gas phase within the continuous liquid phase. Within the absorption zone in the absorption unit, sieve trays 6 with downcomers are mounted to improve the mass transfer between the continuous phase and the dispersed gas to improve the absorption. The volume of the headspace above the fluid level at the upper end of the absorption unit is reduced by incorporation of displacers 7 and a flame barrier 8 is positioned in the gas exit line.

The present invention refers to a process for the recovery of combustible components of a gas stream comprising the combustible components and oxygen by selective absorption of the combustible components in a solvent, whereby during the absorption the gas phase is dispersed in a continuous liquid phase of the solvent.

According to the present invention, certain matters are preferred; as follows:

a) the process is a continuous process;

b) the gas bubbles dispersed in the continuous phase have a diameter of 10 mm or less, preferably of 5 mm at the most;

c) the gas stream is introduced into an absorption unit at a lower section of the absorption unit and the liquid solvent phase enters the absorption unit at a position upwards with respect to the location the gas stream enters the absorption unit, whereby the gas stream and the solvent pass through the absorption unit countercurrently and the liquid solvent phase exits the absorption unit at a position below the entry of the gas stream into the absorption unit;

d) the absorption unit is run as bubble column;

e) the volume of the head space above the liquid level of the continuous phase is reduced by displacers;

f) the gas stream exiting the liquid solvent phase is diluted with an inert gas to the extent that the oxygen concentration is below the explosion limit;

g) the inert gas is selected from nitrogen, water vapor, carbon dioxide or mixtures thereof;

h) the gas stream is introduced into the absorption unit through a system of ring nozzles;

i) the flow conditions within the absorption unit are selected to provide gas bubbles dispersed in the continuous liquid phase having a diameter of 10 mm or less, preferably of 5 mm at the most;

j) the absorption unit comprises heat exchange means and/or gas dispersing means;

k) sieve trays are positioned within the absorption unit;

l) the gas stream is the gaseous effluent of an oxidation process using peroxide compounds; and m) the solvent is selected from alcohols, aliphatic and aromatic hydrocarbons and ketones.

According to a preferred embodiment, the present invention relates to a process for the epoxidation of propene with hydrogen peroxide in an alcoholic solvent in presence of a catalyst, wherein a gas stream comprising unreacted propene, propene oxide and oxygen from the decomposition of the hydrogen peroxide is separated from the reaction mixture and the combustible components in said gas stream are recovered using a process as described above.

Preferably, in the recovery step the same alcoholic solvent as in the epoxidation step is used. Preferably, the solvent is methanol.

Preferably, the liquid solvent phase comprising the recovered combustible components is either recycled to the epoxidation step or is passed to a working up stage downstream from the epoxidation step.

The present invention will now be explained in more detail with reference to examples.

EXAMPLE 1

A tube having a diameter of 76 millimeters and a length of 1,000 millimeters was filled with benzene and the temperature was maintained at 70° C. At the lower end, pure oxygen was injected at 4 bar pressure at a flow rate of 200 liters per hour. The portion of the gas phase within the tubular absorption unit was 5 volume percent as measured by the increase of the height of the liquid level. Due to the volatility of benzene, the uprising dispersed gas phase will be loaded with benzene and immediately reaches an ignitable composition. A glow wire was immersed 10 centimeters below the liquid level, and it was tried to ignite the gas phase by applying an electrical pulse of 500 Watts. But no ignition of the dispersed gas phase could be observed.

EXAMPLE 2

Example 1 was repeated with an oxygen flow of 170 liters per hour, while the portion of the dispersed gas phase within the liquid phase was 25 volume percent. But also in this experiment, no ignition of the dispersed gas phase could be observed. The examples show that a gas phase containing a combustible material and oxygen in a ratio that is within the explosion range cannot be ignited as long as the gas phase is finely dispersed within a continuous liquid phase. Further modifications and variations will be apparent to those skilled in the art from the foregoing and are intended to be encompassed by the claims appended hereto.

We claim:

1. A process for the recovery of combustible components of a gas stream containing the combustible components and oxygen as a gas phase comprising selective absorption of the combustible components in an organic solvent, and during the absorption dispersing the gas phase in a continuous liquid phase of said organic solvent.

2. The process of claim 1, further comprising carrying out the process continuously.

3. The process of claim 1, wherein gas bubbles are dispersed in the continuous phase of the solvent and have a diameter of 10 mm or less.

4. The process of claim 1, wherein gas bubbles are dispersed in the continuous phase of the solvent and have a diameter of 5 mm at most.

5. The process of claim 2, wherein gas bubbles are dispersed in the continuous phase of the solvent and have a diameter of 5 mm or less.

6. The process of claim 1, further comprising introducing the gas stream into an absorption unit at a lower section of the absorption unit and liquid solvent phase enters the absorption unit at a position upwards with respect to the location where the gas stream enters the absorption unit, whereby the gas stream and the solvent pass through the absorption unit counter-currently and the liquid solvent phase exits the absorption unit at a position below the entry of the gas stream into the absorption unit.

7. The process of claim 2, further comprising introducing the gas stream into an absorption unit at a lower section of the absorption unit and liquid solvent phase enters the absorption unit at a position upwards with respect to the location where the gas stream enters the absorption unit, whereby the gas stream and the solvent pass through the absorption unit counter-currently and the liquid solvent phase exits the absorption unit at a position below the entry of the gas stream into the absorption unit.

8. The process of claim 2, wherein absorption is performed in a bubble column.

9. The process of claim 6, wherein absorption is performed in a bubble column.

10. The process of claim 6, wherein absorption unit is run as a bubble column.

11. A process for the recovery of combustible components of a gas stream containing the combustible components and oxygen as a gas phase comprising selective absorption of the combustible components in an organic solvent, and during the absorption dispersing the gas chase in a continuous liquid chase of said organic solvent, wherein the continuous liquid phase has a liquid level defining a volume of head space above the liquid level, which head space is reduced by displacers.

12. The process of claim 11 wherein said, absorption is performed in a bubble column.

13. The process of claim 6, wherein the gas stream exiting the liquid solvent phase is diluted with an inert gas to the extent that oxygen concentration is below the explosion limit.

14. A process for the recovery of combustible components of a gas stream containing the combustible components and oxygen as a gas chase comprising selective absorption of the combustible components in an organic solvent, and during the absorption dispersing the gas phase in a continuous liquid phase of said organic solvent;
    wherein the gas stream exiting the liquid solvent phase is diluted with an inert gas to the extent that oxygen concentration is below the explosion limit, and
    said absorption being preformed in a bubble column.

15. The process of claim 13, wherein the inert gas is selected from the group consisting of nitrogen, water vapor, carbon dioxide and mixtures thereof.

16. The process of claim 14, wherein the inert gas is selected from the group consisting of nitrogen, water vapor, carbon dioxide and mixtures thereof.

17. The process of claim 6, wherein the gas stream is introduced into the absorption unit through a system of ring nozzles.

18. The process of claim 8, wherein the gas stream is introduced into a bubble column through a system of ring nozzles.

19. The process according to claim 17, wherein said ring nozzles have orifices with a cross section in the size range of 0.2 to 2 mm.

20. The process according to claim 18, wherein said ring nozzles have orifices with a cross section in the size range of 0.2 to 2 mm.

21. The process of claim 6, wherein flow conditions within the absorption unit are selected to provide gas bubbles dispersed in the continuous liquid phase having a diameter of 10 mm or less.

22. The process of claim 8, wherein flow conditions within the absorption unit are selected to provide gas bubbles dispersed in the continuous liquid phase having a diameter of 10 mm or less.

23. A process for the recovery of combustible components of a gas stream containing the combustible components and oxygen as a gas phase comprising selective absorption of the combustible components in an organic solvent, and during the absorption dispersing the gas phase in a continuous liquid phase of said organic solvent,
    further comprising introducing the gas stream into an absorption unit at a lower section of the absorption unit and liquid solvent phase enters the absorption unit at a position upwards with respect to the location where the gas stream enters the absorption unit, whereby the gas stream and the solvent pass through the absorption unit counter-currently and the liquid solvent phase exits the absorption unit at a position below the entry of the gas stream into the absorption unit,
    wherein sieve trays are used as gas dispersing means and said absorption unit comprises at least one of heat exchanger or gas disperser.

24. A process for the recovery of combustible components of a gas stream containing the combustible components and oxygen as a gas phase comprising selective absorption of the combustible components in an organic solvent, and during the absorption dispersing the gas chase in a continuous liquid phase of said organic solvent wherein, absorption is performed in a bubble column having sieve trays used as gas dispersing means.

25. The process according to claim 23, wherein said sieve trays have orifice cross sections of 0.2 to 2 mm.

26. The process according to claim 24, wherein said sieve trays have orifice cross sections of 0.2 to 2 mm.

27. A process for the recovery of combustible components of a gas stream containing the combustible components and oxygen as a gas phase comprising selective absorption of the combustible components in an organic solvent, and during the absorption dispersing the gas chase in a continuous liquid phase of said organic solvent, wherein the gas stream is the gaseous effluent of an oxidation process using peroxide compounds.

28. A process for the recovery of combustible components of a gas stream containing the combustible components and oxygen as a gas phase comprising selective absorption of the combustible components in an organic solvent, and during the absorption dispersing the gas phase in a continuous liquid phase of said organic solvent, wherein the organic solvent is selected from the group consisting of alcohols, aliphatic and aromatic hydrocarbons and ketones.

29. A process for the recovery of combustible components of a gas stream containing the combustible components and oxygen as a gas phase comprising selective absorption of the combustible components in an organic solvent, and during the absorption dispersing the gas phase in a continuous liquid phase of said organic solvent, wherein no inert gas is introduced during the absorption.

30. A process for the epoxidation of propene comprising forming an epoxidation mixture by reacting propene with hydrogen peroxide in an alcoholic solvent in the presence of a catalyst, separating a gas stream comprising unreacted propene, propene oxide and oxygen from the decomposition of the hydrogen peroxide from the epoxidation reaction mixture and recovering combustible components in said gas stream by absorption in a solvent, whereby said gas stream is dispersed in a continuous liquid phase of the absorption solvent.

31. The process of claim 30, wherein recovery of combustible components uses the same alcoholic solvent as in the epoxidation.

32. The process of claim 31, wherein the solvent is methanol.

33. The process of claim 31, wherein the liquid solvent phase comprising recovered combustible components is either recycled to the epoxidation or is passed to a working up stage downstream from the epoxidation.

* * * * *

UNITED STATES PATENT AND TRADEMARK OFFICE
CERTIFICATE OF CORRECTION

PATENT NO. : 6,749,668 B2
DATED : June 15, 2004
INVENTOR(S) : Hofen, Willi et al.

It is certified that error appears in the above-identified patent and that said Letters Patent is hereby corrected as shown below:

Column 7,
Line 16, claim 6 should read as follows:
-- the absorption unit and liquid solvent phase entering the --
Line 25, claim 7 should read as follows:
-- the absorption unit and liquid solvent phase entering the --
Line 34, claim 9 should read as follows:
-- 9. The process of claim 3, wherein absorption is per- --
Line 36, claim 10 should read as follows:
-- 10. The process of claim 6, wherein the absorption unit is run --
Line 42, claim 11 should read as follows:
-- the absorption dispersing the gas phase in a continuous --
Line 43, claim 11 should read as follows:
-- liquid phase of said organic solvent, wherein the continuous --
Line 47, claim 12 should read as follows:
-- 12. The process of claim 11, wherein said absorption is --
Line 55, claim 14 should read as follows:
-- oxygen as a gas phase comprising selective absorption of the --
Line 60, claim 14 should read as follows:
-- diluted with an inert gas to the extent that the oxygen --
Line 62, claim 14 should read as follows:
-- said absorption is performed in a bubble column. --

Column 8,
Line 29, claim 23 should read as follows:
-- and liquid solvent phase entering the absorption unit at a --
Line 43, claim 24 should read as follows:
-- the absorption dispersing the gas phase in a continuous --
Line 44, claim 24 should read as follows:
-- liquid phase of said organic solvent, wherein absorption is --
Line 55, claim 27 should read as follows:
-- the absorption dispersing the gas phase in a continuous --

UNITED STATES PATENT AND TRADEMARK OFFICE
CERTIFICATE OF CORRECTION

PATENT NO. : 6,749,668 B2
DATED : June 15, 2004
INVENTOR(S) : Hofen, Willi et al.

It is certified that error appears in the above-identified patent and that said Letters Patent is hereby corrected as shown below:

Column 10,
Line 4, claim 31 should read as follows:
-- 31. The process of claim 30, wherein the recovery of com- --
Line 5, claim 31 should read as follows:
-- bustible components uses the same alcoholic solvent as --

Signed and Sealed this

Twenty-third Day of November, 2004

JON W. DUDAS
*Director of the United States Patent and Trademark Office*